US012683234B2

(12) United States Patent
Takahashi

(10) Patent No.: US 12,683,234 B2
(45) Date of Patent: Jul. 14, 2026

(54) POWER STORAGE

(71) Applicant: TOYOTA JIDOSHA KABUSHIKI KAISHA, Toyota (JP)

(72) Inventor: Yuya Takahashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 577 days.

(21) Appl. No.: 18/326,280

(22) Filed: May 31, 2023

(65) Prior Publication Data

US 2024/0030542 A1     Jan. 25, 2024

(30) Foreign Application Priority Data

Jul. 25, 2022     (JP) ................................. 2022-117922

(51) Int. Cl.
*H01M 50/293*     (2021.01)
*H01M 50/209*     (2021.01)
*H01M 50/271*     (2021.01)
*H01M 50/291*     (2021.01)

(52) U.S. Cl.
CPC ....... *H01M 50/293* (2021.01); *H01M 50/209* (2021.01); *H01M 50/271* (2021.01); *H01M 50/291* (2021.01)

(58) Field of Classification Search
CPC ................................................ H01M 50/271
See application file for complete search history.

(56) References Cited

U.S. PATENT DOCUMENTS

| | | | |
|---|---|---|---|
| 2019/0355940 A1 | 11/2019 | Satou et al. | |
| 2022/0247040 A1 | 8/2022 | Kogami et al. | |
| 2023/0268600 A1* | 8/2023 | Lee ..................... | H01M 50/293 |
| | | | 429/99 |
| 2024/0170780 A1* | 5/2024 | Taga ................... | H01M 50/242 |

FOREIGN PATENT DOCUMENTS

| | | |
|---|---|---|
| JP | 2007-113707 A | 5/2007 |
| JP | 2017-054755 A | 3/2017 |
| JP | 2017-168439 A | 9/2017 |
| JP | 6826916 B2 | 2/2021 |
| WO | 2020/261729 A1 | 12/2020 |

* cited by examiner

*Primary Examiner* — Brian R Ohara
(74) *Attorney, Agent, or Firm* — Oliff PLC

(57) ABSTRACT

A power storage includes a stack, a case, a lid portion, and an elastic member. The lid portion is fixed to an opening end of the case to cover the opening. The elastic member is located between the stack and the lid portion. The elastic member includes a first elastic portion and a second elastic portion. The first elastic portion includes a portion of the elastic member located most distant from the opening end in a second direction orthogonal to a first direction which is a direction in which the stack and the lid portion are opposed to each other. The second elastic portion is located on opposing sides of the first elastic portion in the second direction. An elastic modulus in the first direction of the first elastic portion is lower than an elastic modulus in the first direction of the second elastic portion.

7 Claims, 3 Drawing Sheets

FIG.4
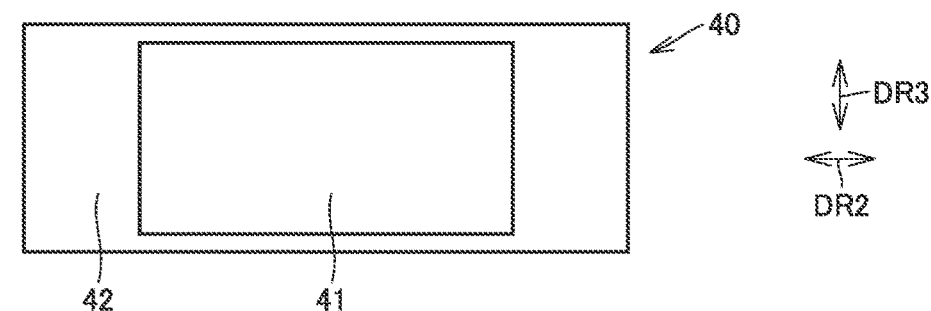
FIG.5
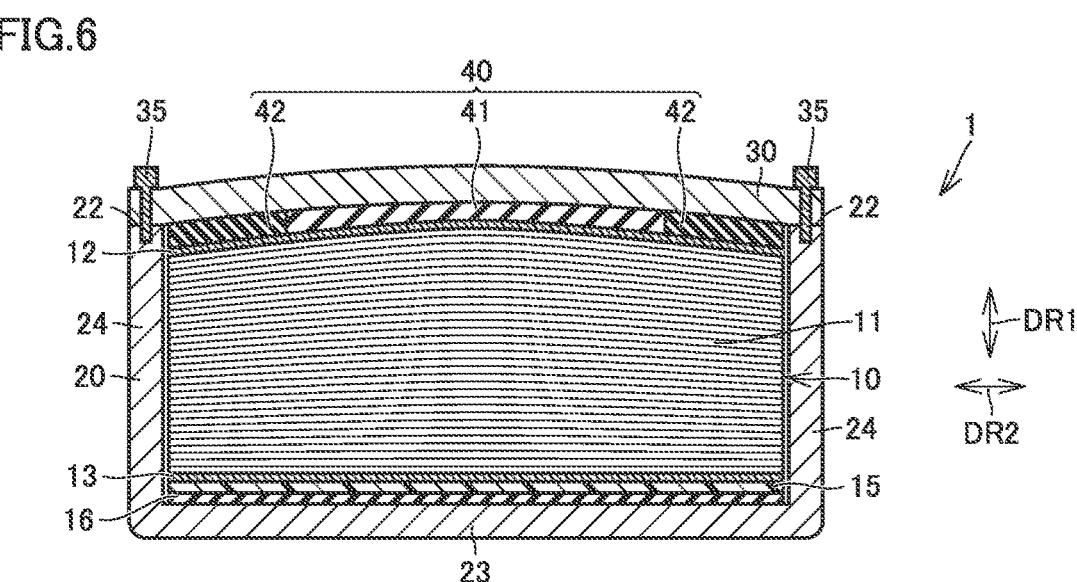
FIG.6

POWER STORAGE

CROSS REFERENCE TO RELATED APPLICATIONS

This nonprovisional application is based on Japanese Patent Application No. 2022-117922 filed with the Japan Patent Office on Jul. 25, 2022, the entire contents of which are hereby incorporated by reference.

BACKGROUND

Field

The present disclosure relates to a power storage.

Description of the Background Art

Japanese Patent No. 6826916 discloses a battery pack as a conventional power storage. The battery pack includes a laminated body, a cell case, a first lid member, a pressure sensor, and a decompressor. The laminated body includes laminated unit cells. The cell case is formed of a rigid material and provided with a first opening, and the laminated body is arranged therein. The first lid member tightly closes the first opening. The first lid member is fixed to the cell case with the use of a fastening member such as a screw. The first lid member is formed from an elastic film. When an internal pressure in the cell case measured by the pressure sensor is equal to or more than an upper limit value, the decompressor decreases the pressure inside the cell case, and when the internal pressure reaches a lower limit value, the decompressor stops decompressing the inside of the cell case. When the decompressor decreases the pressure inside the cell case, the first lid member elastically deforms to come into contact with one face of the laminated body and to apply the pressure based on a difference between the internal pressure and the external pressure of the cell case to the contacting face.

SUMMARY

In the power storage disclosed in Japanese Patent No. 6826916, in order to apply an appropriate pressing pressure to the laminated body, constituent members such as the pressure sensor and the decompressor are required. Control of the pressure inside the cell case with the use of the pressure sensor and the decompressor is also required. Therefore, from a point of view of reduction in number of constituent members and a point of view of simplified control, desirably, the appropriate pressing pressure is applied to the laminated body without using such apparatuses. For example, a highly rigid lid portion fixed to the case may apply a load to the laminated body.

Application of the load to the laminated body by the highly rigid lid portion, however, gives rise to a problem when a cell included in the laminated body expands. Specifically, as the cell expands due to deterioration or a charging state thereof, a portion (for example, a substantially central portion) of the laminated body distant from a portion where the lid portion and the case are fixed particularly greatly expands. Then, large repulsive force from the lid portion is applied to that portion of the laminated body, which causes variation in magnitude of the load applied to the laminated body.

The present disclosure was made to solve problems described above, and an object thereof is to provide a power storage capable of achieving suppression of variation of a load applied by a lid portion to a stack due to expansion of a cell.

A power storage according to one aspect of the present disclosure includes a stack, a case, a lid portion, and an elastic member. The stack includes a plurality of cells stacked on one another. The case is provided with an opening. The stack is accommodated in the case. The lid portion is fixed to an opening end of the case to cover the opening. The elastic member is located between the stack and the lid portion. The elastic member includes a first elastic portion and a second elastic portion. The first elastic portion includes a portion of the elastic member located most distant from the opening end in a second direction orthogonal to a first direction which is a direction in which the stack and the lid portion are opposed to each other. The second elastic portion is located on opposing sides of the first elastic portion in the second direction. An elastic modulus in the first direction of the first elastic portion is lower than an elastic modulus in the first direction of the second elastic portion.

According to the construction, when a portion of the stack located most distant from the opening end in the second direction tends to deform with expansion of the cell, the first elastic portion is relatively greatly compressed by repulsive force of the lid portion, because the elastic modulus in the first direction of the first elastic portion is lower than the elastic modulus in the first direction of the second elastic portion. Deformation of the portion of the lid portion located most distant from the opening end in the second direction is thus suppressed. As deformation of that portion of the lid portion is suppressed, repulsive force from that portion of the lid portion becomes smaller. In other words, increase in load applied by that portion of the lid portion to the stack is suppressed. Therefore, variation in magnitude of the load applied by the lid portion to the stack due to expansion of the cell can be suppressed.

In one form of the present disclosure, the elastic member is accommodated in the case as being compressed in the first direction. In the first direction, an amount of compression of the first elastic portion is equal to or larger than an amount of compression of the second elastic portion.

According to the construction, in a state before expansion of the cell, variation in magnitude of the load applied to the stack due to a difference between the elastic modulus in the first direction of the first elastic portion and the elastic modulus in the first direction of the second elastic portion can be suppressed.

In one form of the present disclosure, in the first direction, a dimension of a free length of the first elastic portion is equal to or larger than a dimension of a free length of the second elastic portion.

According to the construction, when the elastic member is accommodated in the case as being compressed, the amount of compression of the first elastic portion can readily be made larger than the amount of compression of the second elastic portion.

In one form of the present disclosure, the lid portion includes a first plate portion and a second plate portion. The first plate portion is aligned with the first elastic portion in the first direction. The second plate portion is aligned with the second elastic portion in the first direction. The first plate portion is located nearer to the stack than the second plate portion.

According to the construction, when the elastic member is accommodated in the case as being compressed, with the first plate portion, the amount of compression of the first elastic portion can readily be made larger than the amount of compression of the second elastic portion.

In one form of the present disclosure, when viewed in the first direction, the first elastic portion is larger in area than the second elastic portion.

According to the construction, when the cell expands, deformation of the lid portion can be suppressed over a wider range. Variation in magnitude of the load applied to the stack can thus further be suppressed.

In one form of the present disclosure, when viewed in the first direction, the second elastic portion surrounds the first elastic portion.

According to the construction, over the entire area in the vicinity of the opening end, the lid portion can apply a desired load to the stack with the second elastic portion relatively high in elastic modulus being interposed.

In one form of the present disclosure, when viewed in the first direction, the opening in the case is provided such that a longitudinal direction thereof extends in the second direction. In a third direction orthogonal to both of the first direction and the second direction, the first elastic portion extends from one end to the other end of the elastic member.

According to the construction, in a central area in the longitudinal direction where deformation of the lid portion due to expansion of the cell is relatively large, owing to the first elastic portion, deformation of the lid portion can be suppressed all over in the third direction. Variation in magnitude of the load applied to the stack can thus further be suppressed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4 is a plan view of an elastic member in the power storage according to the first embodiment of the present disclosure.

FIG. 5 is a cross-sectional view of the power storage according to the first embodiment of the present disclosure, in a state before a lid portion is assembled to a case.

FIG. 6 is a cross-sectional view of the power storage according to the first embodiment of the present disclosure, in a state where a cell expands.

DESCRIPTION OF THE PREFERRED EMBODIMENTS

Figure 1:
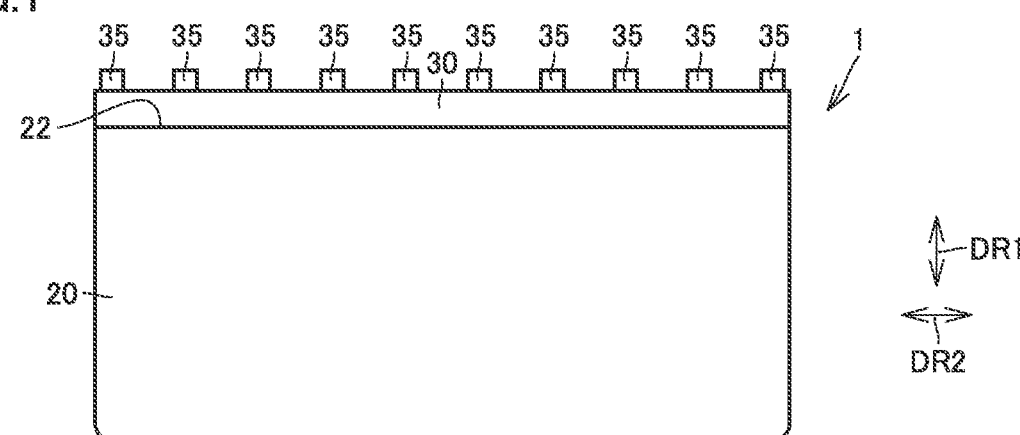
FIG. 1 is a front view of a power storage according to a first embodiment of the present disclosure.

A power storage according to each embodiment of the present disclosure will be described below. In the description of the embodiment below, the same or corresponding elements in the drawings have the same reference characters allotted and description thereof will not be repeated.

First Embodiment

Figure 2:
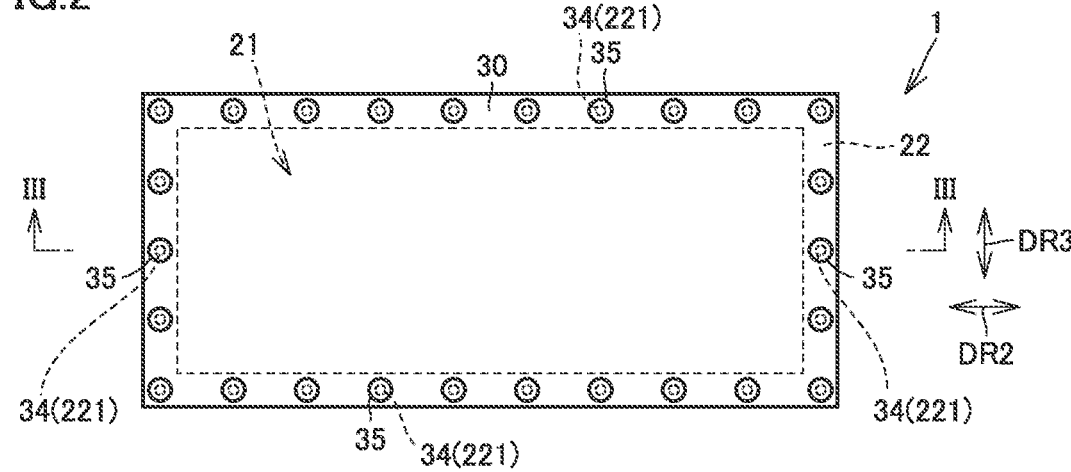
FIG. 2 is a plan view of the power storage according to the first embodiment of the present disclosure.
Figure 3:
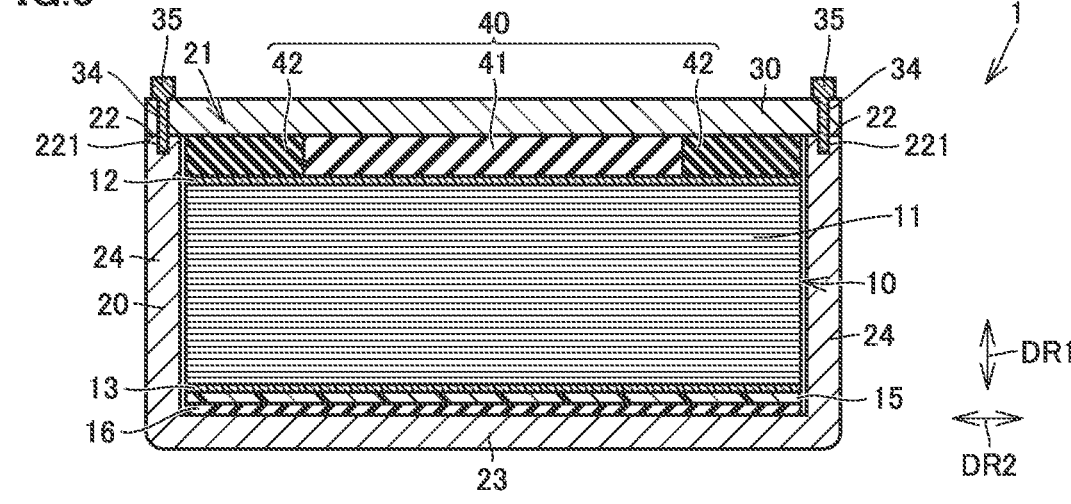
FIG. 3 is a cross-sectional view of the power storage in FIG. 2 along the line III-III.

FIG. 1 is a front view of a power storage according to a first embodiment of the present disclosure. FIG. 2 is a plan view of the power storage according to the first embodiment of the present disclosure. FIG. 3 is a cross-sectional view of the power storage in FIG. 2 along the line III-III. A power storage 1 according to the first embodiment of the present disclosure may be mounted on a vehicle such as a hybrid vehicle that can travel with motive power from at least one of a motor and an engine or an electrically powered vehicle that travels with drive force obtained from electrical energy.

Power storage 1 includes a stack 10, a case 20, a lid portion 30, and an elastic member 40.

Stack 10 includes a plurality of cells 11, a first current collector 12, and a second current collector 13.

Cell 11 is, for example, what is called a bipolar battery. More specifically, the plurality of cells 11 are each a laminate type aqueous battery and a secondary battery such as a lithium ion battery. Cell 11 is not limited as above, and it may be an all-solid battery or a capacitor.

The plurality of cells 11 are stacked on one another in a first direction DR1. The plurality of cells 11 may be stacked on one another in a second direction DR2 orthogonal to first direction DR1. The plurality of cells 11 may be stacked on one another in a third direction DR3 orthogonal to both of first direction DR1 and second direction DR2.

In a mounted state in which power storage 1 is mounted on a vehicle, first direction DR1 is in parallel to a vertical direction of a vehicle. In the mounted state, second direction DR2 is in parallel to a lateral direction of the vehicle. In the mounted state, third direction DR3 is in parallel to a front-rear direction of the vehicle.

First current collector 12 is located on one side of the plurality of cells 11 as a whole in a direction (first direction DR1) in which the plurality of cells 11 are stacked. First current collector 12 is, for example, a current collector for a positive electrode. First current collector 12 is connected to a not-shown positive electrode terminal.

Second current collector 13 is located on the other side of the plurality of cells 11 as a whole in the direction (first direction DR1) in which the plurality of cells 11 are stacked. Second current collector 13 is, for example, a current collector for a negative electrode. Second current collector 13 is connected to a not-shown negative electrode terminal.

Power storage 1 may further include a spacer 15 and an insulating member 16. Spacer 15 is aligned with stack 10 in first direction DR1. In the present embodiment, when viewed from second current collector 13, spacer 15 is located opposite to the plurality of cells 11. Spacer 15 may be composed of a relatively highly rigid material or a readily elastically deformable material. Insulating member 16 is located opposite to stack 10 when viewed from spacer 15.

Case 20 is formed of a relatively highly rigid material. Case 20 is provided with an opening 21. Opening 21 in case 20 is provided such that a longitudinal direction thereof extends in second direction DR2 when viewed in first direction DR1. An outer geometry of opening 21 is rectangular when viewed in first direction DR1. Case 20 includes an opening end 22. Opening 21 is a space surrounded by opening end 22. Opening end 22 is in a rectangular surrounding shape when viewed in first direction DR1. In opening end 22, a plurality of holes 221 extending in first direction DR1 are provided. The plurality of holes 221 are aligned as surrounding the opening along a direction in which opening end 22 extends when viewed in first direction DR1.

Case 20 further includes a bottom portion 23 and a sidewall portion 24. Bottom portion 23 is located opposite to opening 21 in case 20. Sidewall portion 24 extends from bottom portion 23 in first direction DR1. Opening end 22 is a tip end portion of sidewall portion 24 in first direction DR1.

In the present embodiment, bottom portion 23 and sidewall portion 24 are formed from a single constituent member. Bottom portion 23 and sidewall portion 24 may be formed from constituent members different from each other.

Stack 10, spacer 15, and insulating member 16 are accommodated in case 20. Insulating member 16 is carried on bottom portion 23 of case 20. Spacer 15 is carried on bottom portion 23 of case 20 with insulating member 16 being interposed. Stack 10 is carried on bottom portion 23 of case 20 with spacer 15 and insulating member 16 being interposed.

Lid portion 30 is fixed to opening end 22 of case 20 to cover opening 21. Lid portion 30 is fixed over the entire opening end 22 in the surrounding shape when viewed in first direction DR1. Lid portion 30 is provided with a plurality of through holes 34. The plurality of through holes 34 are located as being superimposed on the plurality of holes 221, respectively, when viewed in first direction DR1. In the present embodiment, power storage 1 further includes a plurality of fastening members 35. The plurality of fastening members 35 are inserted in the plurality of through holes 34, respectively, to lock lid portion 30. The plurality of fastening members 35 are fitted to the plurality of holes 221, respectively. Specifically, bolts are employed as the plurality of fastening members 35.

A method of fixing lid portion 30 to case 20 is not limited to the method above. For example, lid portion 30 may be joined to opening end 22 by welding.

Elastic member 40 is located between stack 10 and lid portion 30. Elastic member 40 abuts on each of stack 10 and lid portion 30. Another member such as another spacer and another insulating member may be located between elastic member 40 and stack 10. Another member such as another spacer and another insulating member may be located between elastic member 40 and lid portion 30.

A length in second direction DR2 of elastic member 40 is substantially equal to a length of stack 10. The length in second direction DR2 of elastic member 40 may be longer or shorter than stack 10. Preferably, the entire stack 10 is covered with elastic member 40 when viewed in first direction DR1.

Elastic member 40 includes a first elastic portion 41 and a second elastic portion 42. First elastic portion 41 and second elastic portion 42 are preferably formed of an insulating material. First elastic portion 41 and second elastic portion 42 may be formed, for example, from synthetic rubber such as silicone rubber or urethane rubber, a foam composed of a resin material, or a spring such as a leaf spring or a coil spring. First elastic portion 41 and second elastic portion 42 may be formed from a plurality of individual constituent members, respectively. First elastic portion 41 and second elastic portion 42 may be formed from a single constituent member.

First elastic portion 41 includes a portion of elastic member 40 located most distant from opening end 22 in second direction DR2 orthogonal to first direction DR1 in which stack 10 and lid portion 30 are opposed to each other.

In the present embodiment, the portion is a substantially central portion of elastic member 40 in second direction DR2.

FIG. 4 is a plan view of the elastic member in the power storage according to the first embodiment of the present disclosure. As shown in FIGS. 3 and 4, second elastic portion 42 is located on opposing sides of first elastic portion 41 in second direction DR2. Specifically, when viewed in first direction DR1, second elastic portion 42 surrounds first elastic portion 41. First elastic portion 41 is larger in area than second elastic portion 42 when viewed in first direction DR1. First elastic portion 41 may be smaller in area than second elastic portion 42 when viewed in first direction DR1.

When viewed in first direction DR1, elastic member 40 has a rectangular outer geometry. First elastic portion 41 also has a rectangular outer geometry when viewed in first direction DR1. The outer geometry of elastic member 40, first elastic portion 41, and second elastic portion 42 when viewed in first direction DR1, however, is not particularly limited.

FIG. 5 is a cross-sectional view of the power storage according to the first embodiment of the present disclosure in a state before the lid portion is assembled to the case. As shown in FIGS. 3 and 5, elastic member 40 is accommodated in case 20 as being compressed in first direction DR1.

A dimension of a free length of first elastic portion 41 in first direction DR1 is larger than a dimension of a free length of second elastic portion 42. Therefore, after lid portion 30 is assembled to case 20, an amount of compression of first elastic portion 41 is larger than an amount of compression of second elastic portion 42. The dimension of the free length of first elastic portion 41 in first direction DR1 may be substantially equal to the dimension of the free length of second elastic portion 42.

In the present disclosure, an elastic modulus in first direction DR1 of first elastic portion 41 is lower than an elastic modulus in first direction DR1 of second elastic portion 42. Variation in magnitude of the load applied to stack 10 by lid portion 30 due to expansion of cell 11 can thus be suppressed. Details of this effect will be described below.

FIG. 6 is a cross-sectional view of the power storage according to the first embodiment of the present disclosure, in a state where the cell expands. As shown in FIG. 6, when the portion of stack 10 located most distant from opening end 22 in second direction DR2 (the substantially central portion in second direction DR2 in the present embodiment) tends to deform with expansion of cell 11, first elastic portion 41 is compressed relatively greatly by repulsive force of lid portion 30, because the elastic modulus in first direction DR1 of first elastic portion 41 is lower than the elastic modulus in first direction DR1 of second elastic portion 42. Deformation of the portion of lid portion 30 located most distant from opening end 22 in second direction DR2 (the substantially central portion in second direction DR2 in the present embodiment) is thus suppressed. As deformation of that portion of lid portion 30 is suppressed, repulsive force from that portion of lid portion 30 becomes smaller. In other words, increase in load applied to stack 10 by that portion of lid portion 30 is suppressed. Therefore, variation in magnitude of the load applied to stack 10 by lid portion 30 due to expansion of cell 11 can be suppressed.

While the power storage is mounted on the vehicle, a pair of sidewall portions 24 of case 20 aligned in second direction DR2 is held on a body of the vehicle. Therefore, when the vehicle travels over a road surface with irregularities or height differences, impact resulting therefrom applies stress to sidewall portions 24 in second direction DR2. As the stress is applied to sidewall portions 24, lid portion 30 resonates in first direction DR1 with a portion where it is fixed to opening end 22 being defined as a fulcrum. In particular, when the vehicle travels over an undulating road and stress is applied to sidewall portions 24 in specific cycles, resonance in first direction DR1 of lid portion 30 is excited. With this great resonance, the portion of lid portion 30 located most distant from opening end 22 tends to greatly deform. In this case as well, since the elastic modulus in first direction DR1 of first elastic portion 41 is lower than the elastic modulus in first direction DR1 of second elastic portion 42, increase in load applied to stack 10 by that portion of lid portion 30 is suppressed owing to first elastic portion 41. Variation in magnitude of the load applied to stack 10 by lid portion 30 can thus be suppressed.

As shown in FIGS. 3 and 5, the amount of compression of first elastic portion 41 is larger than the amount of compression of second elastic portion 42. Therefore, in a state before cell 11 expands, variation in magnitude of the load applied to stack 10 caused by the difference between the elastic modulus in first direction DR1 of first elastic portion 41 and the elastic modulus in first direction DR1 of second elastic portion 42 can be suppressed.

The dimension of the free length of first elastic portion 41 in first direction DR1 is larger than the dimension of the free length of second elastic portion 42. Therefore, when elastic member 40 is accommodated in case 20 as being compressed, the amount of compression of first elastic portion 41 can readily be made larger than the amount of compression of second elastic portion 42.

Furthermore, as shown in FIG. 4, in one form of the present disclosure, when viewed in first direction DR1, first elastic portion 41 is larger in area than second elastic portion 42. Therefore, when cell 11 expands, deformation of lid portion 30 can be suppressed over a wider range. Variation in magnitude of the load applied to stack 10 can thus further be suppressed.

In one form of the present disclosure, when viewed in first direction DR1, second elastic portion 42 surrounds first elastic portion 41. Therefore, over the entire area in the vicinity of opening end 22, lid portion 30 can apply a desired load to stack with second elastic portion 42 relatively high in elastic modulus being interposed.

Figure 7:
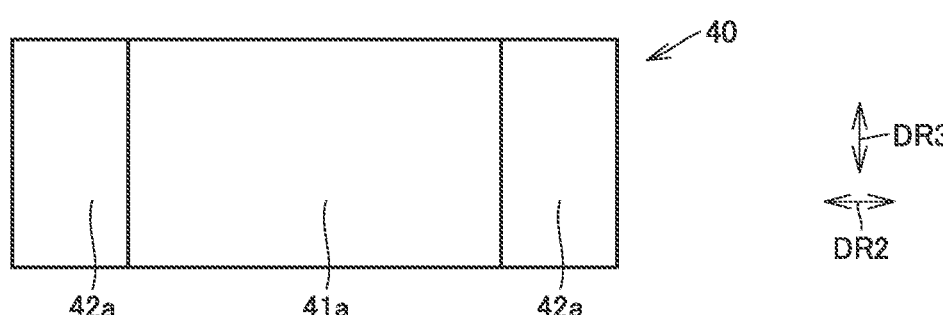
FIG. 7 is a plan view of the elastic member in a modification of the first embodiment of the present disclosure.

The construction of first elastic portion 41 and second elastic portion 42 when viewed in first direction DR1 is not limited to the construction described above. FIG. 7 is a plan view of the elastic member in a modification of the first embodiment of the present disclosure.

As shown in FIG. 7, in the modification of the first embodiment of the present disclosure, in third direction DR3 orthogonal to both of first direction DR1 and second direction DR2, a first elastic portion 41a extends from one end to the other end of elastic member 40. According to the construction, in a central area in the longitudinal direction (second direction DR2) in which deformation of lid portion 30 with expansion of cell 11 is relatively great, owing to first elastic portion 41a, deformation of lid portion 30 can be suppressed all over in third direction DR3. Variation in magnitude of the load applied to stack 10 can thus further be suppressed.

In the present modification, in second direction DR2, a pair of second elastic portions 42a is located on opposing sides of first elastic portion 41a. These second elastic portions 42a also extend from one end to the other end of elastic member 40 in third direction DR3.

Second Embodiment

A power storage according to a second embodiment of the present disclosure will now be described. The power storage according to the second embodiment of the present disclosure is different from that in the first embodiment of the present disclosure in that a lid portion is different from lid portion 30 in shape. Therefore, description of the construction similar to that in power storage 1 according to the first embodiment of the present disclosure will not be repeated.

Figure 8:
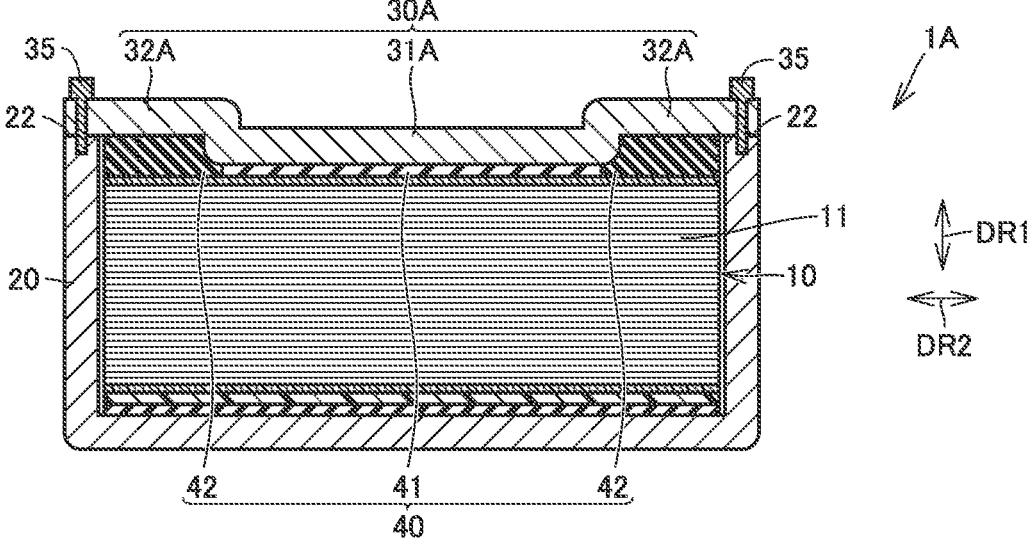
FIG. 8 is a cross-sectional view of a power storage according to a second embodiment of the present disclosure.

FIG. 8 is a cross-sectional view of the power storage according to the second embodiment of the present disclosure. FIG. 8 shows a cross-sectional view similar to that in FIG. 3. As shown in FIG. 8, in a power storage 1A according to the second embodiment of the present disclosure, a lid portion 30A includes a first plate portion 31A and a second plate portion 32A. First plate portion 31A is aligned with first elastic portion 41 in first direction DR1. Second plate portion 32A is aligned with second elastic portion 42 in first direction DR1. First plate portion 31A is located nearer to stack 10 than second plate portion 32A.

According to the construction, when elastic member 40 is accommodated in case 20 as being compressed, owing to first plate portion 31A, the amount of compression of first elastic portion 41 can readily be made larger than the amount of compression of second elastic portion 42.

Figure 9:
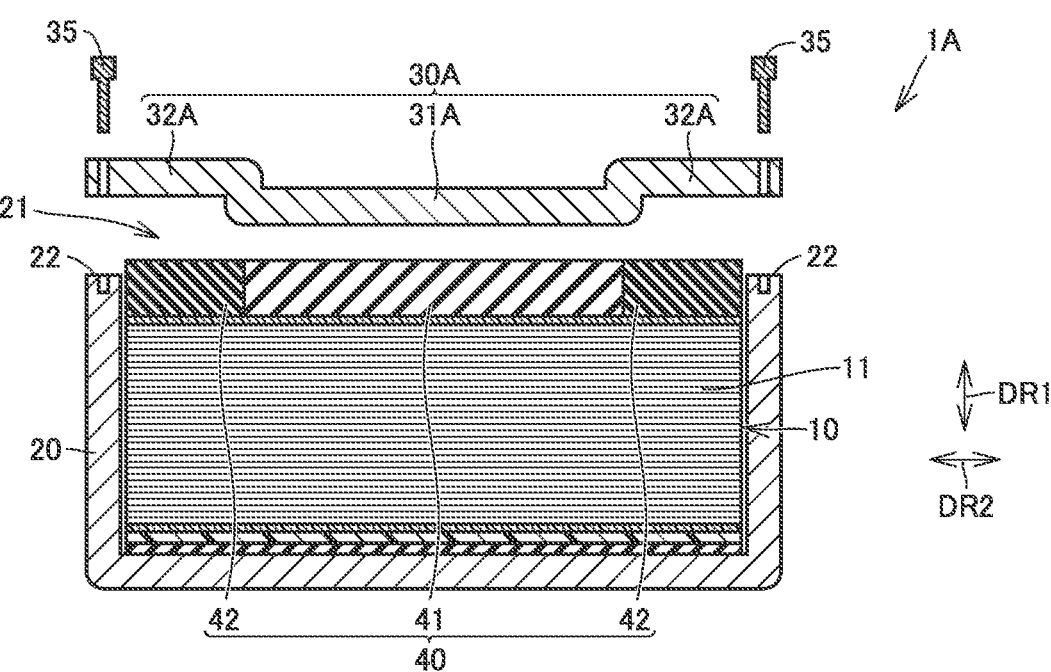
FIG. 9 is a cross-sectional view showing the power storage according to the second embodiment of the present disclosure, in a state before a lid portion is assembled to the case.

FIG. 9 is a cross-sectional view showing the power storage according to the second embodiment of the present disclosure, in a state before the lid portion is assembled to the case. As shown in FIG. 9, in the present embodiment, the dimension of the free length of first elastic portion 41 in first direction DR1 is equal to the dimension of the free length of second elastic portion 42. Owing to positional relation between first plate portion 31A and second plate portion 32A, however, the amount of compression of first elastic portion 41 is larger than the amount of compression of second elastic portion 42. Thus, variation in magnitude of the load applied to stack 10 due to the difference between the elastic modulus in first direction DR1 of first elastic portion 41 and the elastic modulus in first direction DR1 of second elastic portion 42 in a state before cell 11 expands can be suppressed. The dimension of the free length of first elastic portion 41 in first direction DR1 may be larger or smaller than the dimension of the free length of second elastic portion 42. Depending on the positional relation between first plate portion 31A and second plate portion 32A rather than relation between the dimensions of the free lengths of first elastic portion 41 and second elastic portion 42, the amount of compression of first elastic portion 41 is also preferably larger than the amount of compression of second elastic portion 42 in first direction DR1.

In power storage 1A according to the second embodiment of the present disclosure as well, the elastic modulus in first direction DR1 of first elastic portion 41 is lower than the elastic modulus in first direction DR1 of second elastic portion 42. Variation in magnitude of the load applied to stack 10 by lid portion 30A due to expansion of cell 11 can thus be suppressed.

In the description of the embodiments above, features that can be combined may be combined to each other.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

9

10

What is claimed is:

1. A power storage comprising:

a stack including a plurality of cells stacked on one another in a stacking direction;

a case where the stack is accommodated, the case being provided with an opening;

a lid portion fixed to an opening end of the case to cover the opening; and an elastic member located between the stack and the lid portion in the stacking direction, wherein the elastic member includes a first elastic portion and a second elastic portion that are both between the stack and the lid portion in the stacking direction, the first elastic portion including a portion of the elastic member located most distant from the opening end in a second direction orthogonal to a first direction which is the stacking direction and which is a direction in which the stack and the lid portion are opposed to each other, the second elastic portion being located on opposing sides of the first elastic portion in the second direction, and an elastic modulus in the first direction of the first elastic portion is lower than an elastic modulus in the first direction of the second elastic portion.

2. The power storage according to claim 1, wherein the elastic member is accommodated in the case as being compressed in the first direction, and in the first direction, an amount of compression of the first elastic portion is equal to or larger than an amount of compression of the second elastic portion.

3. The power storage according to claim 2, wherein in the first direction, a dimension of a free length of the first elastic portion is equal to or larger than a dimension of a free length of the second elastic portion.

4. The power storage according to claim 2, wherein the lid portion includes a first plate portion aligned with the first elastic portion in the first direction and a second plate portion aligned with the second elastic portion in the first direction, and the first plate portion is located nearer to the stack than the second plate portion.

5. The power storage according to claim 1, wherein when viewed in the first direction, the first elastic portion is larger in area than the second elastic portion.

6. The power storage according to claim 1, wherein when viewed in the first direction, the second elastic portion surrounds the first elastic portion.

7. The power storage according to claim 1, wherein when viewed in the first direction, the opening in the case is provided such that a longitudinal direction of the opening extends in the second direction, and in a third direction orthogonal to both of the first direction and the second direction, the first elastic portion extends from one end to the other end of the elastic member.

* * * * *